US012628794B2

(12) United States Patent (10) Patent No.: US 12,628,794 B2
Charpentier (45) Date of Patent: May 19, 2026

(54) DOG PLACE MARKER SYSTEM AND METHOD

(71) Applicant: Alisa Charpentier, Houma, LA (US)

(72) Inventor: Alisa Charpentier, Houma, LA (US)

( * ) Notice: Subject to any disclaimer, the term of this patent is extended or adjusted under 35 U.S.C. 154(b) by 0 days.

(21) Appl. No.: 18/612,410

(22) Filed: Mar. 21, 2024

(65) Prior Publication Data

US 2024/0251755 A1 Aug. 1, 2024

Related U.S. Application Data

(63) Continuation-in-part of application No. 17/508,511, filed on Oct. 22, 2021, now Pat. No. 12,465,019.

(51) Int. Cl.
| | |
|---|---|
| *A01K 11/00* | (2006.01) |
| *A01K 1/015* | (2006.01) |
| *A01K 13/00* | (2006.01) |
| *A01K 15/02* | (2006.01) |

(52) U.S. Cl.
CPC .......... *A01K 11/006* (2013.01); *A01K 1/0157* (2013.01); *A01K 13/006* (2013.01); *A01K 15/021* (2013.01)

(58) Field of Classification Search
CPC .................................................... A01K 1/0157
USPC ........................................................ 119/174
See application file for complete search history.

(56) References Cited

U.S. PATENT DOCUMENTS

| | | | | |
|---|---|---|---|---|
| 6,637,367 | B1 * | 10/2003 | Dost .................... | A01K 27/006 |
| | | | | 119/28.5 |
| 6,708,650 | B1 * | 3/2004 | Yates ................... | A01K 27/002 |
| | | | | 119/818 |
| 7,275,502 | B2 | 10/2007 | Boyd et al. | |
| 9,374,983 | B1 * | 6/2016 | Kuehr ................. | A01K 13/006 |
| 2010/0277945 | A1 * | 11/2010 | Hurwitz .............. | A01K 13/003 |
| | | | | 362/570 |
| 2012/0240867 | A1 * | 9/2012 | Flynn ....................... | A01K 1/04 |
| | | | | 119/721 |
| 2013/0092099 | A1 * | 4/2013 | Hardi .................. | A01K 29/005 |
| | | | | 119/721 |
| 2018/0228130 | A1 * | 8/2018 | Van Curen .......... | A01K 15/023 |
| 2019/0148933 | A1 * | 5/2019 | Olszyk .................... | H02H 7/20 |
| | | | | 340/635 |
| 2019/0357497 | A1 * | 11/2019 | Honchariw .......... | A01K 15/021 |
| 2019/0373860 | A1 * | 12/2019 | Kath .................... | A01K 13/006 |

* cited by examiner

*Primary Examiner* — David J Parsley
*Assistant Examiner* — Sahar Almatrahi
(74) *Attorney, Agent, or Firm* — KEATY LAW FIRM LLC; Thomas S. Keaty

(57) ABSTRACT

A dog place marker system and method providing a place-marker unit formed as a planar mat of a colored single-ply waterproof fabric with a low-profile binding, grommets, and a leash opening, having an electronic subsystem with a main electronic unit, a power unit, a controller, an RF antenna, and a sensor unit. The proximity of the dog to the place-marker unit can be sensed and reported through a remote unit to a person who is not in the immediate vicinity of the dog and the place-marker unit. In a preferred embodiment, an on-dog electronic unit is also provided to enhance the ability to identify a specific dog and provide more detailed information about the dog's position on or near the place-marker unit.

18 Claims, 10 Drawing Sheets

26

DOG PLACE MARKER SYSTEM AND METHOD

CROSS-REFERENCE TO RELATED APPLICATION

This application is a continuation-in-part of application Ser. No. 17/508,511, filed on Oct. 22, 2021, the full disclosure of which is incorporated by reference herein and priority of which is hereby claimed.

BACKGROUND OF THE INVENTION

This invention provides a dog place marker system and method.

Dogs kept as pets, companions, or service dogs are more comfortable in familiar environments and circumstances where the dog knows what kind of behavior is expected, and which precise locations are and are not acceptable for the dog to occupy. In unfamiliar environments and circumstances a dog is less likely to know what kind of behavior is expected, and less likely to know which precise locations are acceptable.

Although a properly trained dog can be expected to stay in a location or on or near an object which has been identified and has become familiar to the dog, during the training period the dog might mistakenly stray, and even a well-trained dog might leave the location or object under some circumstances, such as trying to find and alert the dog's person of something. Especially during training, and then afterward, the person needs to be present, essentially in the room with the dog, in order to know whether the training is being complied with or whether the dog has decided to move away for another reason. If the person is not present, then the ability to convey immediate feedback to the dog is lost.

What is needed is a dog place marker system and method providing an object that a dog can recognize as being associated with the dog, and which provides some reassurance to the dog and provides an indication to the dog of an appropriate precise location to sit and lie down, and additionally providing a means of sensing whether the dog is on or near the object and conveying that information in real time to a person who is not in the immediate vicinity of the dog and the object. Presently known coverings and mats for dogs do not provide such benefits.

U.S. Pat. No. 4,671,049 for a "Protective Blanket for Hoofed and Domestic Animals, In Particular Horses and Dogs," issued on Jun. 9, 2004 to assignee Temova Etablisement, provides for a protective blanket for hoofed and domestic animals, in particular horses and dogs, to protect against the influences of cold in cold weather or due to evaporation of the skin moisture after physical exertion, and for thermal treatment of certain ailments, e.g., influenza or kidney trouble. Woolen or linen blankets have the disadvantage of not giving off the evaporation moisture and do not provide warmth when wet. The protective blanket according to this invention provides better heat protection and has a therapeutic effect due to the fact that it consists of two mutually movable layers of a knit fabric made of nonhygroscopic synthetic fibers fit for generating static electricity and with a mesh of 50-125/cm2. For choice, the blanket contains a synthetic foam lining permeable to air between the two layers of fabric. The drawing shows the outside of a horse blanket with a neck rim at the head end and a rear rim with a loop to accommodate the tail. The cutout at the neck rim produces two blanket ends to fit around the breast.

U.S. Pat. No. 7,017,206 for a "Bag and Towel Combination," issued on Mar. 28, 2006 to inventor Nadia Kedineoglu, provides for a bag and towel combination including a bag assembly that includes a bottom wall and a peripheral wall that is attached to and extends upwardly from the bottom wall. The peripheral wall has an upper edge defining an opening extending into the bag assembly. The bottom wall has a generally rounded shape. The bag assembly has a front side, a back side, and a pair of lateral sides. A flexible panel has a first edge, a second edge, a third edge, and a fourth edge. A coupling assembly includes a first mating portion and a second mating portion. The first mating portion is attached to the panel and is positioned generally adjacent to the first edge. The second mating portion is attached to an inner surface of the bag assembly. The first and second mating portions are removably coupled together.

U.S. Pat. No. 1,595,834 for "Animal Apparel," issued on Aug. 10, 1926 to inventor Roy A. Griffiths, provides for, among other things, a blanket provided with a neck piece, straps, and buckles. The body strap with its fastening means is of ordinary construction. At a point centrally of the blanket and just back of the neck piece, provided is a reinforcing piece sewed or otherwise suitably secured to the blanket and provided with an opening extending through the piece and the blanket through which may pass a ring of a harness.

U.S. Publication No. 2006/0090711 for an "Animal Coat Harness," published on May 4, 2006 by inventor Ruth Richards, discloses an animal harness coat that includes a cover and a harness. The cover and harness are attached together. The cover allows the leash to be attached to the harness. The harness includes a front strap that extends entirely around the neck portion of the animal and a second strap that extends entirely around the body of the animal between the front legs and the hind quarters. As such, a force imparted on the harness through a leash is safely transmitted to the collarbone region and ribcage area of the animal.

U.S. Publication No. 2014/0338127 for a "Blanket with Pet Pocket," published on Nov. 20, 2014 by inventor Lisa M. Latime, discloses a blanket with a pet pocket comprising a front and back surface large enough to cover a bed; a pocket on the front surface smaller than the front surface, wherein the pocket includes a top opening large enough for a household domestic pet to fit comfortably inside.

U.S. Pat. No. 7,121,231 for a "Doggie Blanket Coat," issued on Oct. 17, 2006 to inventor Tamara Lynn Benefiel, provides for a dog coat or blanket that includes a generally rectangular body section with chest and stomach straps extending from front and side edges, respectively. The straps are adjustable so that a few sizes will fit most domesticate dog breeds. Both the body section and the straps are two ply construction and the straps both secure the coat to the dog and cover a substantial portion of either the chest or the stomach to limit heat loss. The dog coat can be mounted on a dog from above merely by draping the coat over the dog and attaching the chest and stomach straps.

U.S. Pat. No. 6,637,367 for a "Method and Apparatus for Easy Transport of an Animal Bed, of Particular Use for Dogs," issued on Oct. 28, 2003 to assignee Dost, Figg, Elliott, et al., LLC, provides for a method of carrying an animal bed that includes placing a harness on an animal, folding the bed, inserting the bed in and between center-facing pouches of a pack, and attaching the pack to the harness. An apparatus for carrying out the method is also described wherein the pack has a protective cover covering the openings of the center facing pouches, the cover having a body strap attached thereto.

U.S. Publication No. 2007/0272170 for a "Therapeutic Pet Jacket and Bed," published on Nov. 29, 2007 by inventors Carl Dutrisac Milson et al., discloses a pet jacket and bed which possesses pockets therein for receiving removably insertable gel packs or grain (oatmeal) packs, which packs can be heated up or cooled as necessary so as to provide hot and cold therapies for convalescent arthritic pets or pets with injuries, or which can simply alter temperature and comfort for the pet.

SUMMARY OF THE INVENTION

The dog place marker system and method provides a place-marker unit formed as a planar mat of a colored single-ply waterproof fabric with a low-profile binding, grommets, and a leash opening, having an electronic subsystem with a main electronic unit, a power unit, a controller, an RF antenna, and a sensor unit. The proximity of the dog to the place-marker unit can be sensed and reported through a remote unit to a person who is not in the immediate vicinity of the dog and the place-marker unit. In a preferred embodiment, an on-dog electronic unit is also provided to enhance the ability to identify a specific dog and provide more detailed information about the dog's position on or near the place-marker unit. In a full-kit embodiment, a carry pouch, a shoulder strap, a cinch strap, and carabiners are also provided for storing, carrying, and using the mat. The place-marker unit mat is used both as a covering for the dog, when the grommets are joined using a carabiner, and as a flat mat for the dog to sit or lie down upon, especially in unfamiliar environments or circumstances.

BRIEF DESCRIPTION OF THE DRAWINGS

Reference will now be made to the drawings, wherein like parts are designated by like numerals, and wherein.

DETAILED DESCRIPTION OF THE INVENTION

Figure 1:
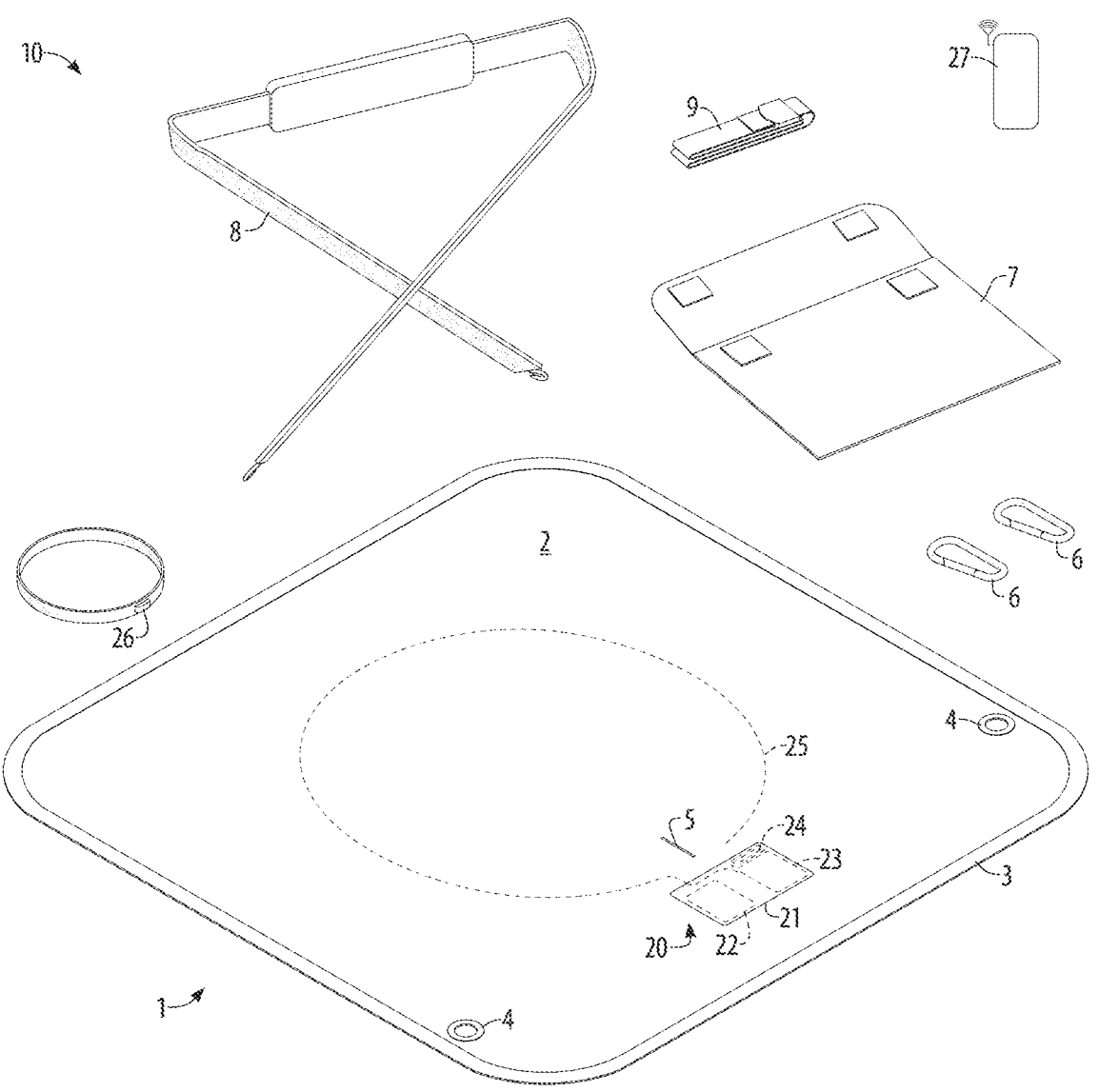
FIG. 1 is an isometric overview of the dog place marker system of the invention.

Referring to FIG. 1, the dog place marker system 10 provides a place-marker unit 1 providing a piece of colored single-ply waterproof fabric 2 having a low-profile binding 3, at least two grommets 4, a leash opening 5, and an electronic subsystem 20 providing a main electronic unit 21, power unit 22, controller 23, RF antenna 24, sensor unit 25, and remote unit 27, all as treated in detail below. In a preferred embodiment the dog place marker system 10 also provides an on-dog electronic unit 26. In a full-kit embodiment, the dog place marker system 10 also provides carabiners 6, a carry pouch 7, a shoulder strap 8, and a cinch strap 9.

Figure 2A:
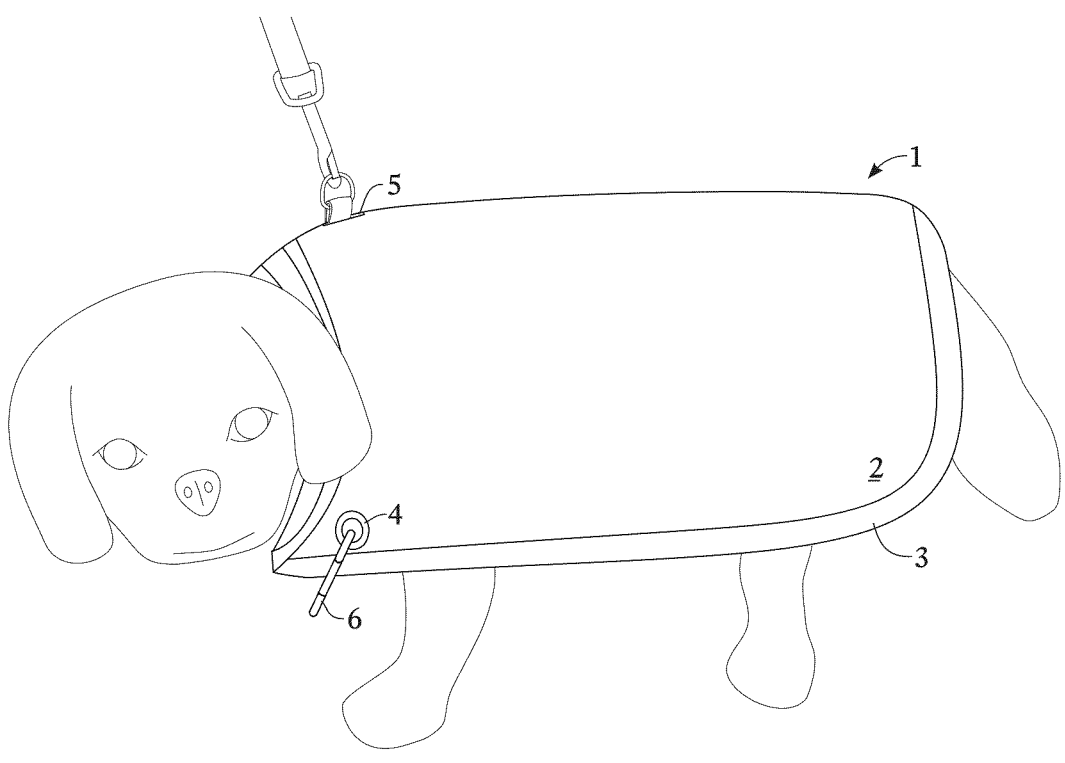
FIG. 2A is a schematic view of the place-marker unit of the dog place marker system of the invention in use as a covering.
Figure 2B:
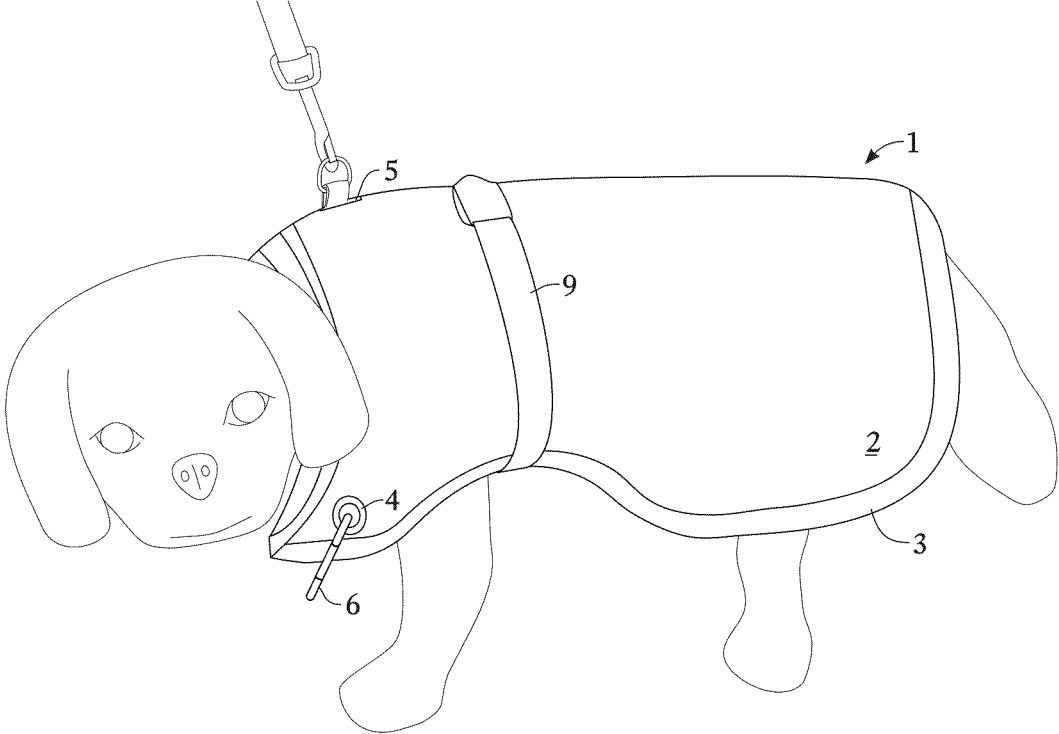
FIG. 2B is a schematic view of the place-marker unit of the dog place marker system of the invention in use as a covering with a cinch strap.

Referring to FIG. 2A and FIG. 2B, the place-marker unit 1 can be used as a cover for the dog, as treated in detail below. Such use as a covering greatly increases the dog's familiarity, comfort, and identification with the place-marker unit 1. The place-marker unit 1 provides a leash opening 5 allowing access to a collar or harness worn by the dog. The leash can be placed through the leash opening 5 to attach to a collar or harness inside the covering, or the attachment point of the collar or harness can be placed through the leash opening 5 with the leash attaching outside the covering. Optionally, in the full-kit embodiment, the cinch strap 9 is used to hold the place-marker unit 1 more closely to the dog. When the place-marker unit is used as a covering, the underside of the dog is not covered and consequently does not interfere with urination for male dogs.

Figure 3:
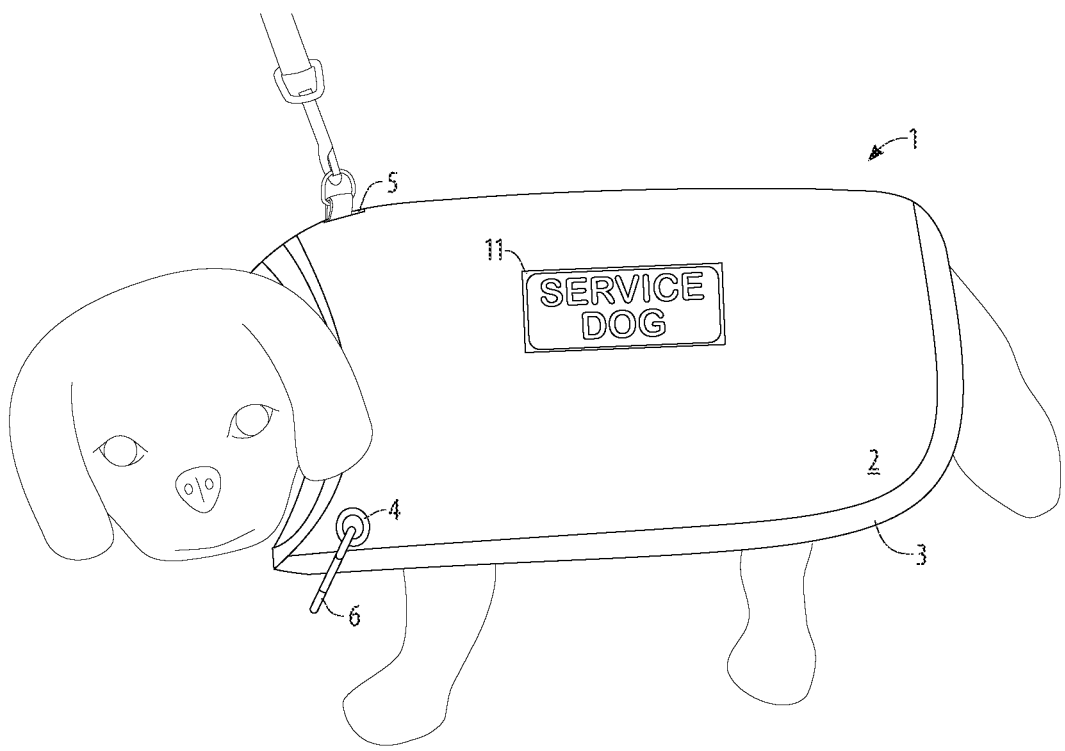
FIG. 3 is a schematic view of the place-marker unit of a service-dog embodiment of the dog place marker system of the invention in use as a covering.

Referring to FIG. 3, in a service-dog embodiment of the dog place marker system 10 the place-marker unit 1 also provides patch-attachment bases 11 for interchangeable and removable attachment of patches showing phrases such as service dog, therapy dog, in training, medical alert, emotional support, diabetic alert, seizure alert, do not pet, or ask to pet. Such a patch might identify the dog as performing a certain function, and might be required in some circumstances. Because the patch is attached to the place-marker unit 1 which is already familiar to the dog through training and use, there is no need to place any new or unfamiliar covering on the dog when using new patches or changing between patches. The patch-attachment bases 11 can be made from hook-and-loop type material to accommodate typical available patches.

Figure 4:
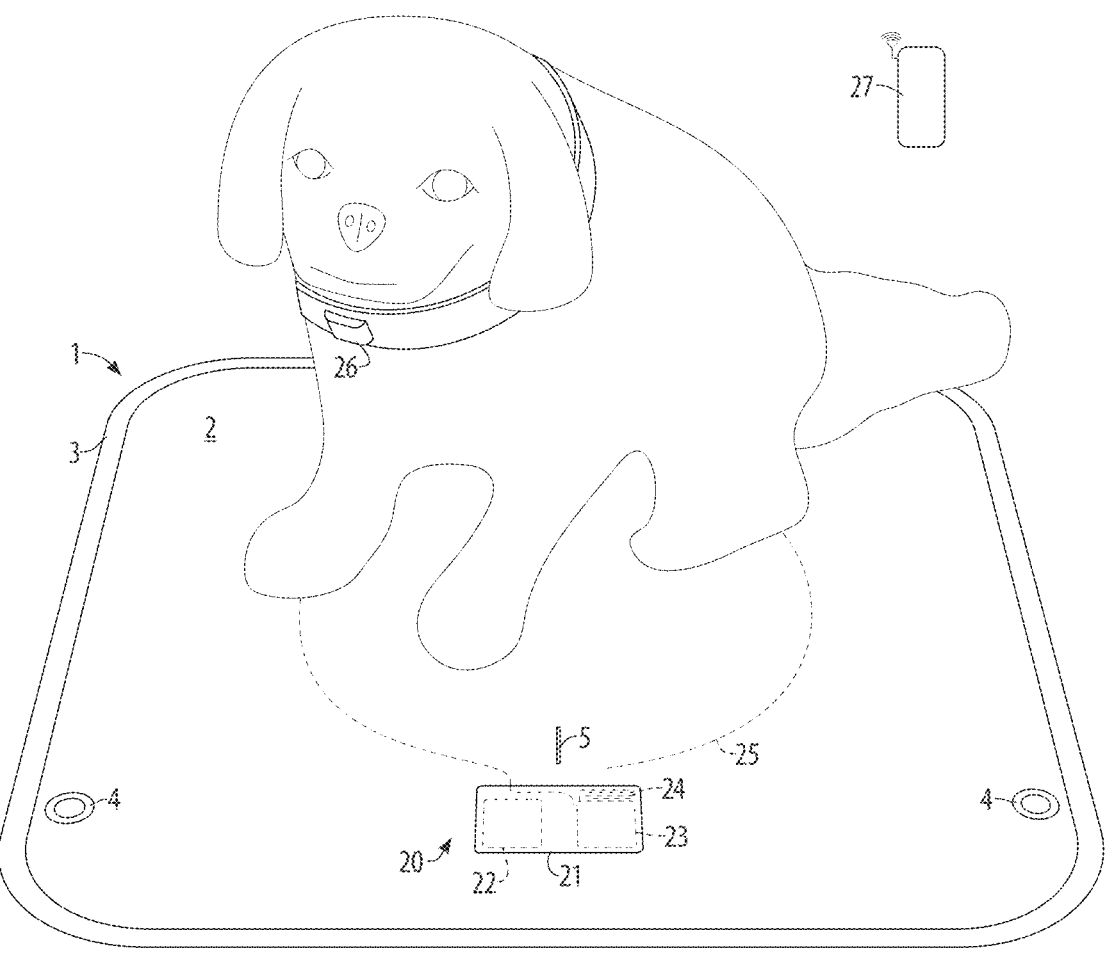
FIG. 4 is a perspective view of the place-marker unit of the dog place marker system of the invention in use as a flat mat.

Referring to FIG. 4, the place-marker unit 1 is also used as a flat mat for the dog to sit or lie down upon as a familiar object which can be placed in unfamiliar environments, locations, or circumstances.

The place-marker unit 1 provides a colored single-ply waterproof fabric 2 which preferably is colored either blue or yellow or both because those are colors dogs can see and distinguish. The place-marker unit 1 thereby provides visual information which helps the dog identify the place-marker unit 1 as being a thing associated with and familiar to the dog even when encountered in different or unfamiliar places or circumstances. The color information is in addition to other information such as smell and other visual information such as shape and texture. The colored single-ply waterproof fabric 2 is intended to function as both a covering for the dog and as a place marker indicating a location where the dog is allowed and encouraged to sit or lie down. The waterproof quality provides protection to the dog from rain or a wet ground, and provides protection to an underlying surface from any moisture or soil carried on the dog's coat or generated by the dog. Appropriate material for the colored single-ply waterproof fabric 2 includes cotton, nylon, or polyester canvas, with a water-proofing treatment, and woven or non-woven synthetic materials such as polypropylene. A low-profile binding 3 surrounds and protects the edges of the colored single-ply waterproof fabric 2. The binding can be made a different color or a different shade from the colored single-ply waterproof fabric 2 in order to increase visual contrast as perceived by the dog, thereby increasing the visual distinctiveness. The binding is attached as a low-profile binding 3 to avoid a pronounced lip or edge which the dog might exploit by chewing. The low-profile binding 3 can be made of nylon, polypropylene, or similar material. At least two grommets 4 are set into the place-marker unit 1 at locations such that the grommets 4 can be brought together and joined at the chest of the dog when using the place-marker unit 1 as a covering, as treated in detail below.

At least two grommets 4 are set into the place-marker unit 1 at locations such that the grommets 4 can be brought together at the chest of the dog such that an edge of the place-marker unit 1 encircles the dogs neck and the colored single-ply waterproof fabric 2 drapes over the dog's back, forming a covering. In use, the two grommets 4 brought together at the dog's chest are connected using the carabiner 6. Additional grommets 4 in excess of two can optionally be provided. Such additional grommets 4 might allow a tighter or looser fit or other variations in fitting the place-marker unit 1 to the dog, or might allow the manufacture of place-marker units 1 which could be fit to a variety of sizes of dogs. The grommets 4 can be made of metal or durable plastic, or can be formed by sewing with a durable thread or cord. The grommets 4 do not move in relation to the place-marker unit 1, and are therefore not distracting to the dog and are not susceptible to being chewed by the dog, as any straps or clasps would be.

The place-marker unit 1 also provides an electronic subsystem 20 which senses the presence or absence of the dog on the place-marker unit 1 used as a mat, and reports such status in real time to a remote unit 27, allowing the dog's person to know the status and to take whatever action is appropriate. During training, it might be appropriate to go to the dog timely enough to associate any correction with the action of leaving the mat. With a trained dog, it might be appropriate to investigate the circumstances which caused the dog to leave the mat. As treated in detail below, the electronic subsystem 20 can transmit radio frequency (RF) signals which can either be transmitted directly to a remote unit 27 or be transmitted through a network such as a cellular network or another network such as an internet of things (IoT) type of network, where the electronic subsystem 20 of the place-marker unit 1 functions as a smart device as known in that art. The remote unit 27 function can be implemented on a purpose-built portable unit or can be implemented as an application on a standard device including a smartphone or a tablet computer.

Figure 8:
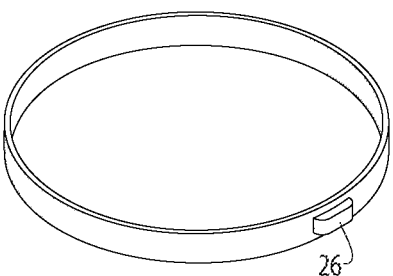
FIG. 8 is an isometric view of the on-dog electronic unit of a preferred embodiment of the dog place marker system of the invention.

Referring additionally to FIG. 8, in a preferred embodiment the dog place marker system 10 also provides an on-dog electronic unit 26, which can be incorporated into or upon the dog's collar or harness. The on-dog electronic unit

26 provides for the identification of a specific dog as being on or near the place-marker unit 1 mat. A basic embodiment of the on-dog electronic unit 26 provides a radio-frequency identification (RFID) tag which transmits an identifying number. Passive and active RFID tags are available. Passive RFID tags are sufficient for determining close proximity and do not require inclusion of a battery in the on-dog electronic unit 26. More elaborate embodiments of the on-dog electronic unit 26 can be provided having capabilities of causing sound, vibration, or light to be emitted from the unit. The use of sound or vibration might be most effective in communicating information to the dog. The use of light might be most effective in attracting the attention of people.

Figure 5:
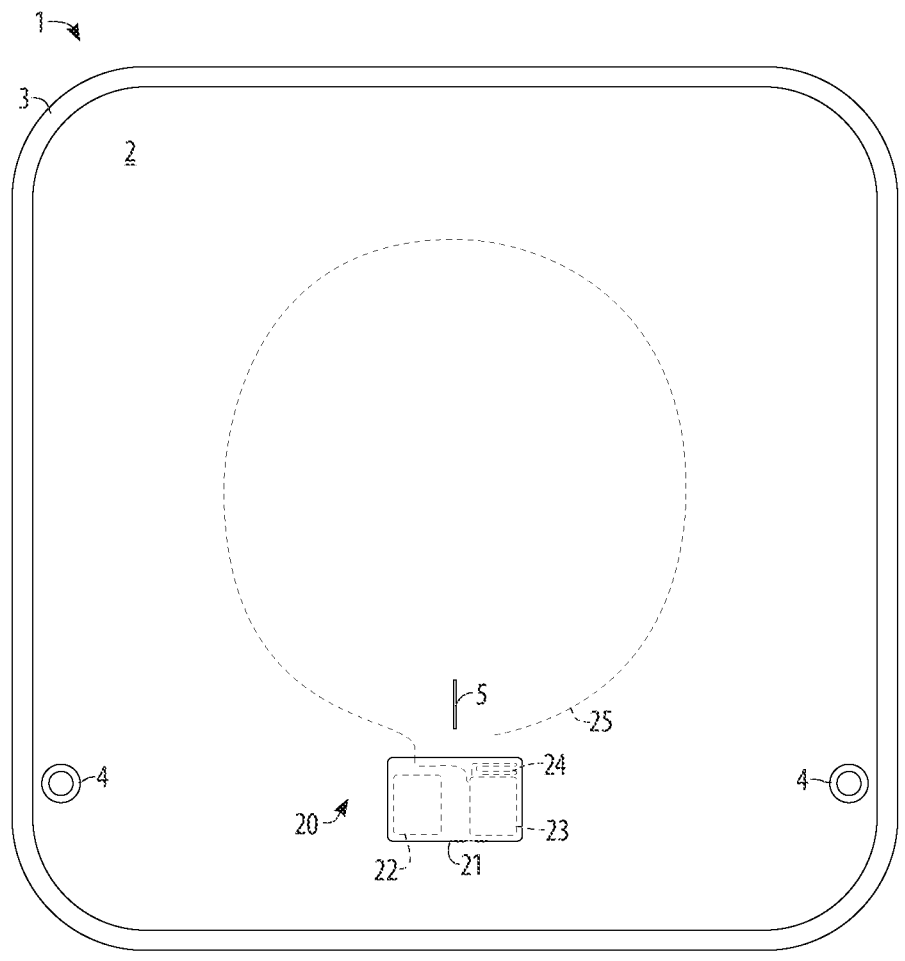
FIG. 5 is a plan view of the place-marker unit of the dog place marker system of the invention.
Figure 6:
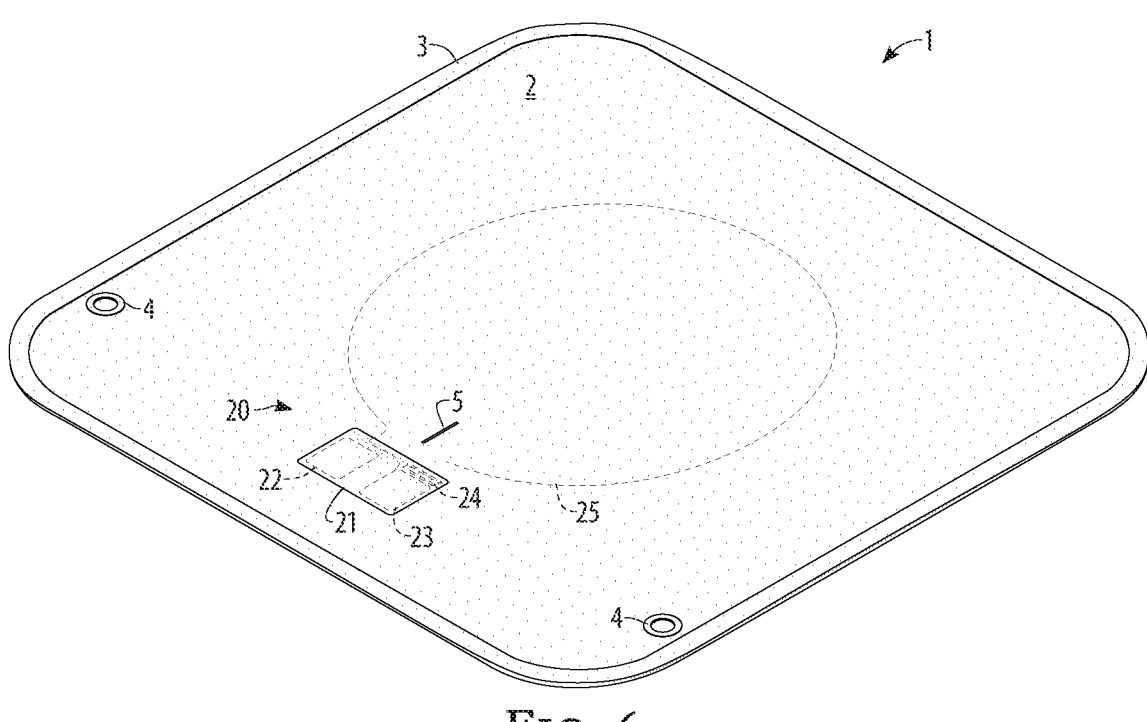
FIG. 6 is a top isometric view of the place-marker unit of the dog place marker system of the invention.
Figure 7:
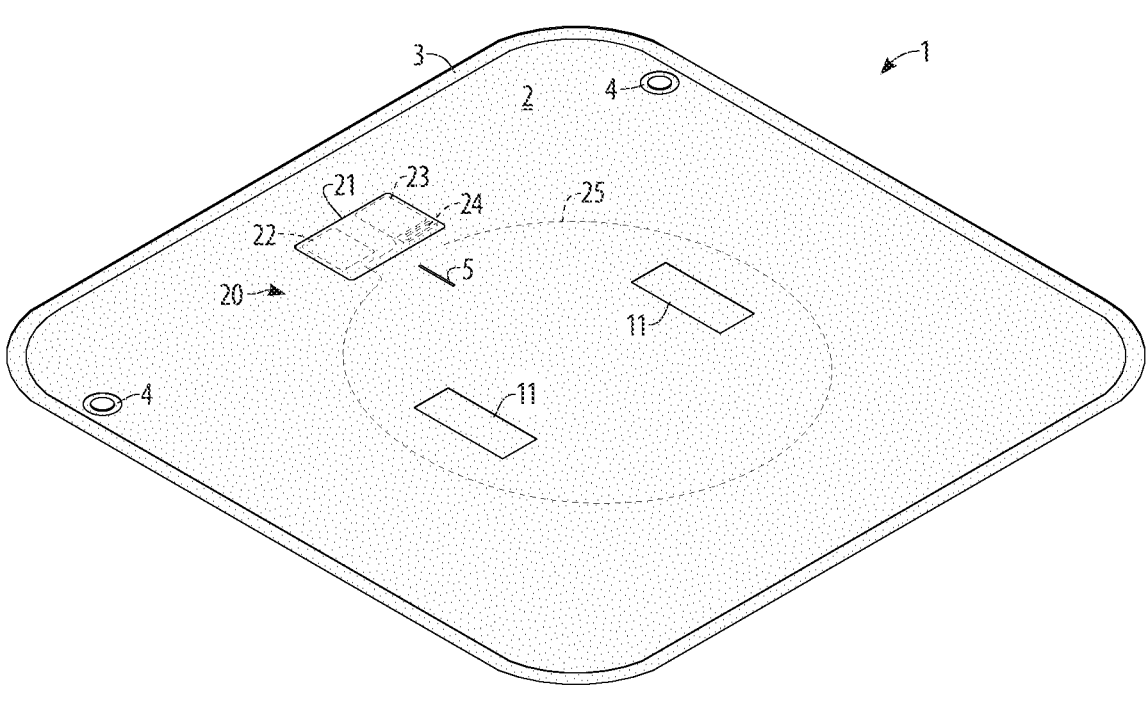
FIG. 7 is a bottom isometric view of the place-marker unit of the dog place marker system of the invention.

Referring to FIG. 5, FIG. 6, and FIG. 7, the electronic subsystem 20 provides a main electronic unit 21 mounted on the colored single-ply waterproof fabric 2 of the place-marker unit 1 in a location which does not interfere with the use of the place-marker unit 1 as a covering or as a mat, and within a suitable waterproof enclosure or pouch. The electronic components of the electronic subsystem 20 can be obtained as standard components which are small, light, and robust enough to be used for this purpose.

The main electronic unit 21 provides a power unit 22 which provides electric power for operation. The power unit 22 can be a battery or a capacitor or supercapacitor of sufficiently small size and light weight. The battery can be either a rechargeable or a replaceable type. If access to the battery is needed for either recharging with a cable or for replacement, then provision should be made for restoring the waterproof quality of the enclosure. Wireless or contactless recharging of the battery can be provided which does not compromise the waterproof quality. A coin cell type of battery could be used as a replaceable battery. A lithium-ion battery such as a lithium cobalt oxide (LiCoO2) or lithium iron phosphate (LiFePO4) can be used as a rechargeable battery. Charging and discharging of the battery can be managed either by electronic circuitry incorporated into the battery, or by the controller 23.

The main electronic unit 21 provides a controller 23 which controls the operation of the electronic subsystem 20. The controller 23 can be implemented using a system-on-chip (SoC) type of integrated circuit which is available and is small, light, and rugged, and which can consume very little power. The RF modem functions of the controller 23 can either be incorporated into a single SoC, or can be performed by a separate coprocessor.

The main electronic unit 21 provides an RF antenna 24 for communication with the remote unit 27 and with the on-dog electronic unit 26 in a preferred embodiment. Very small and light antennae having a looping conductive trace on a plastic back are available, and are used extensively in smart-device type of products. With the exception of devices which are licensed to use certain restricted bands of radio frequencies, most devices use the common frequency bands allowed by different regional jurisdictions. A standard available RF antenna 24 enables the electronic subsystem 20 of the dog place marker system 10 to communicate at the appropriate radio frequencies using either a proprietary protocol or preferably one of the standard protocols such as cellular telephone, Wi-Fi®, Bluetooth®, or LoRa spread spectrum modulation, under the appropriate licenses or subscriptions.

The main electronic unit 21 provides a sensor unit 25 which senses whether the dog is on the mat or is not. A simple embodiment of the sensor unit 25 can sense pressure, temperature, resistance, or capacitance, or some combination, to determine if some dog or similar animal is on the mat. Using the reflection of ultrasound or infrared or ultraviolet light would likely irritate the dog's enhanced sensitivity to those frequencies. A preferred embodiment of the dog place marker system 10 provides an on-dog electronic unit 26, as treated above, allowing the identification of a specific dog, and allowing the sensing of and differentiation between the dog being directly on or being near the mat.

Figure 9:
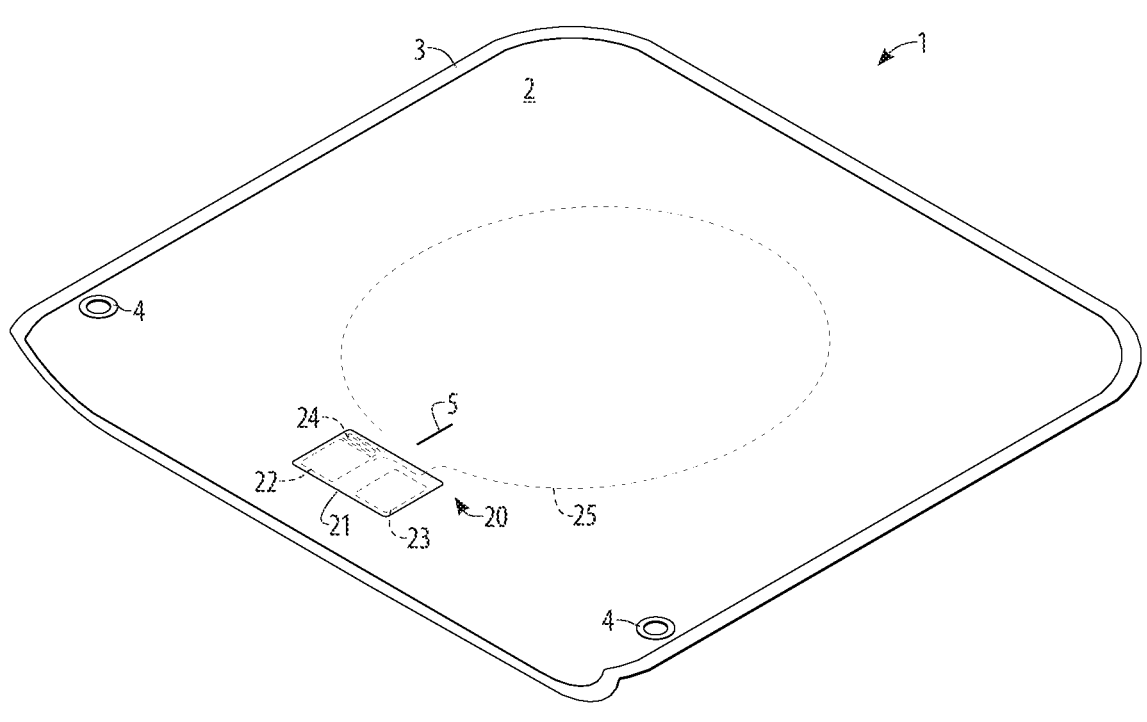
FIG. 9 is an isometric view of the place-marker unit of the dog place marker system of the invention in a first stage of preparation for use as a covering.
Figure 10:
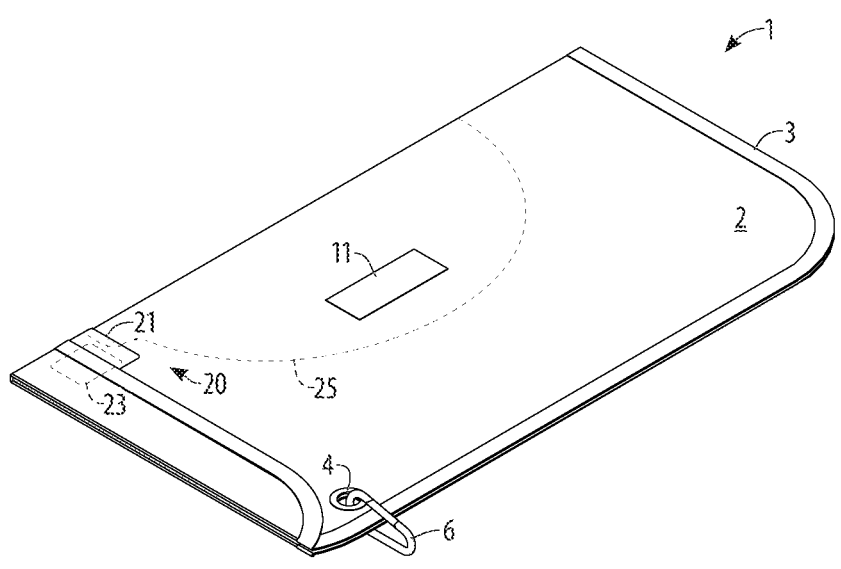
FIG. 10 is an isometric view of the place-marker unit of the dog place marker system of the invention in a second stage of preparation for use as a covering.

Referring to FIG. 9 and FIG. 10, in a first phase of the method of using the dog place marker system 10, in preparation for use as a covering for the dog, the front edge of the place-marker unit 1 can be folded back if needed to improve the fit of the unit on the dog. The two side edges, having grommets 4, are brought together to form the covering for the dog, and the grommets 4 are connected together using a carabiner 6, either before, during, or after placement upon the dog, with the connected grommets being located near the dog's chest, as shown in FIG. 2. While the place-marker unit 1 is used as a covering, it will acquire the scent of the dog and will become familiar to the dog as an object closely associated with the dog. In a service-dog embodiment, patches can be affixed to the patch-attachment bases 11.

Referring again to FIG. 4, in use in a second phase of the method of using the dog place marker system 10, the place-marker unit 1 is placed upon the ground or floor to delineate a place appropriate for the dog to sit or lie down, and to prevent the transfer of moisture or soil between the dog and the ground or floor. An exemplary scenario for such second-phase use is when a dog is brought into an unfamiliar indoor or outdoor place such as a veterinarian's office, another home or business, when traveling, or for an outdoor event or activity. The place-marker unit 1 is brought to the unfamiliar environment and is placed upon the floor or ground at the location which is determined to be appropriate for the dog. The dog's familiarity and association with the place-marker unit 1 signals to the dog that the location is the appropriate location to sit or lie down, and provides something familiar and comforting to the dog in an otherwise unfamiliar environment. The electronic subsystem 20 monitors the continued presence of the dog on the place-marker unit 1, and sends an alert to the remote unit 27 if the dog moves away from the unit, as treated above.

The dog place marker system 10 can be especially beneficial when a dog is placed into an unfamiliar environment or encounters unfamiliar circumstances in the home environment. Because the dog has become familiar with and associated with the place-marker unit 1 through the first phase of the method, use of the place-marker unit 1 can be comforting and reassuring to the dog in two major ways. Wearing the place-marker unit 1 as a covering can be comforting and reassuring to the dog when the dog is brought into an unfamiliar place or when unfamiliar changes occur in the dog's home environment, such as when unfamiliar persons or animals or activities are brought into the home. Additionally, when the place-marker unit 1 is used as a location marker, the place-marker unit 1 can be comforting and reassuring to the dog as a clear indicator of where the dog is expected to sit or lie down.

The availability of real-time alerts through the remote unit 27 allows a person to more closely monitor the dog without having to remain in the immediate vicinity and sight of the dog in order to timely respond to the dog with continued training or by responding to whatever might have caused the dog to move away from the place-marker unit 1.

The dog place marker system is re-useable, and its method of use is based on long use during which a dog becomes familiar and comfortable with the place-marker unit.

Figure 11:
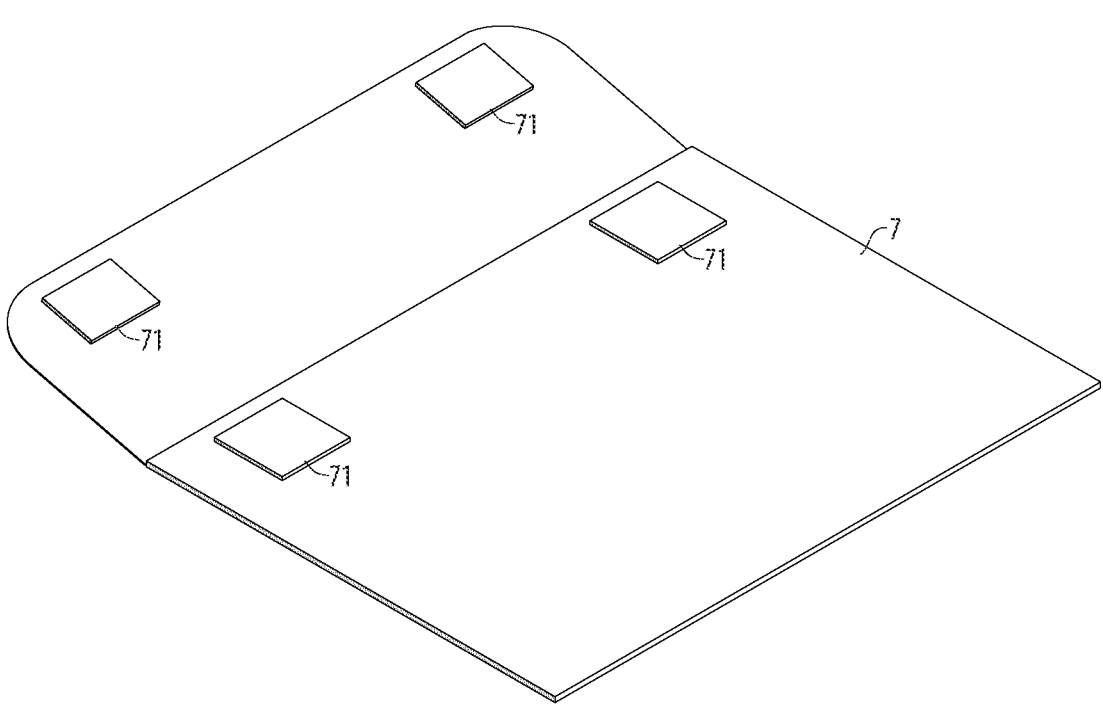
FIG. 11 is a top isometric view of the carry pouch of the dog place marker system of the invention.
Figure 12:
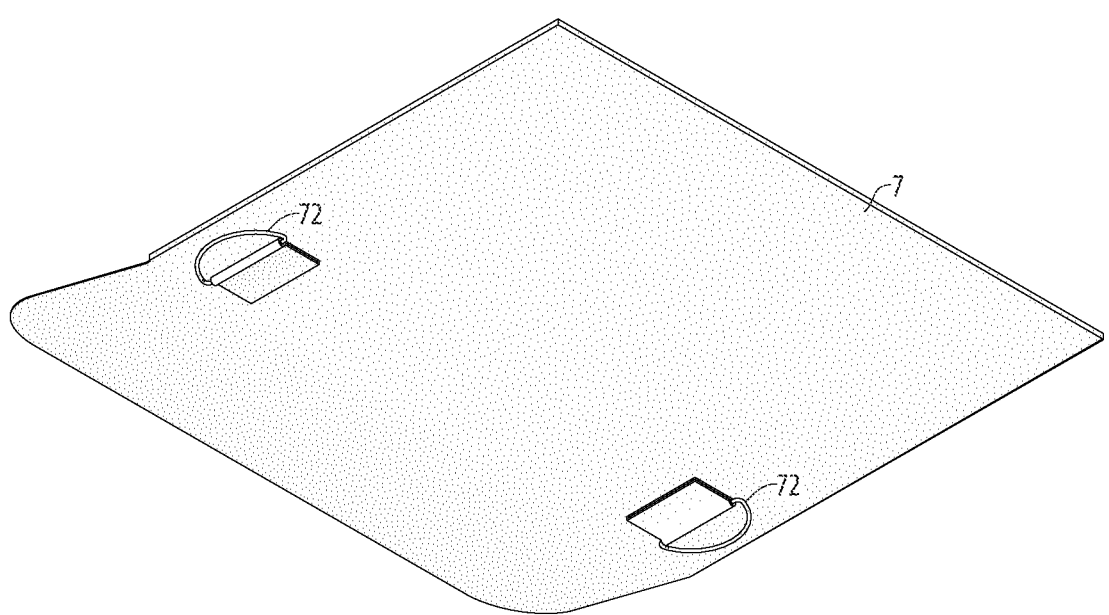
FIG. 12 is a bottom isometric view of the carry pouch of the dog place marker system of the invention.

Referring to FIG. 11 and FIG. 12, in a full-kit embodiment, the dog place marker system 10 also provides a carry pouch 7 to enclose the folded place-marker unit 1 for storage and movement. The carry pouch 7 provides pouch closures 71 which can be made of a hook-and-loop type material which allows for some adjustment of the size of the closed pouch. The carry pouch 7 also provides pouch attachment points 72 for attachment of either the shoulder strap 8, or for attachment to a leash, handbag, or similar object. Metal or hard plastic D-rings can be used as pouch attachment points 72, as shown.

Figure 13:
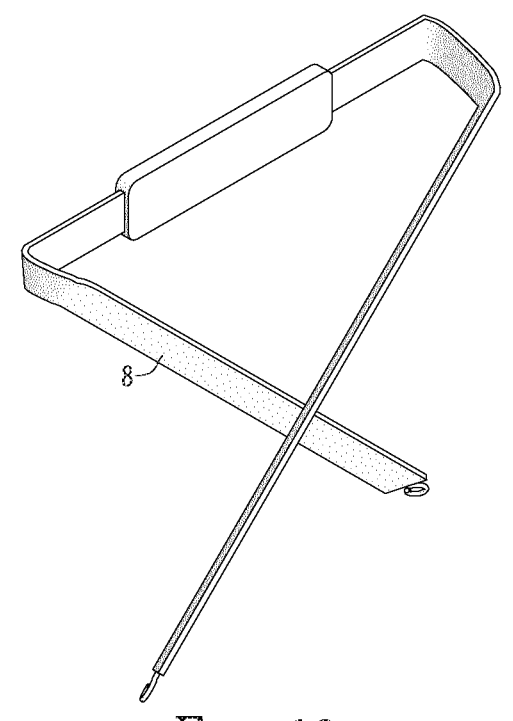
FIG. 13 is an isometric view of the shoulder strap of the dog place marker system of the invention.

Referring to FIG. 13, a shoulder strap 8 for attachment to the carry pouch 7 is provided in the full-kit embodiment of the dog place marker system.

Figure 14:
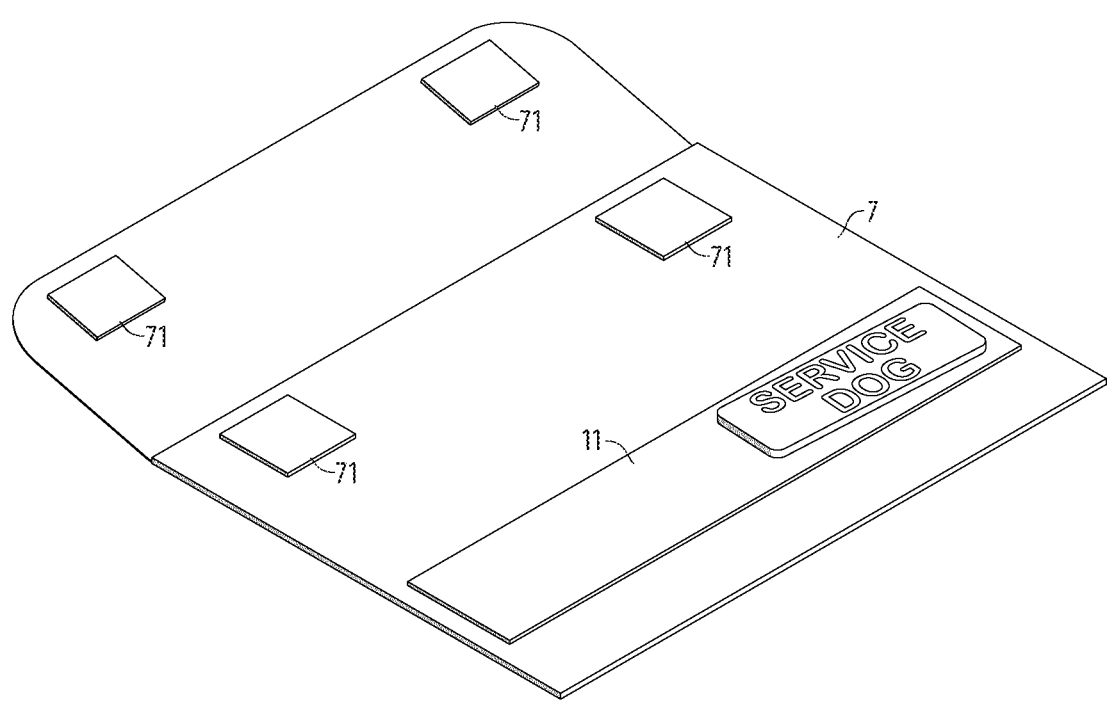
FIG. 14 is a top isometric view of the carry pouch of a service-dog embodiment of the dog place marker system of the invention.

Referring to FIG. 14, in a service-dog embodiment of the dog place marker system 10 the carry pouch 7 further provides an additional patch-attachment base 11 for placement and storage of patches.

Many other changes and modifications can be made in the system and method of the present invention without departing from the spirit thereof. I therefore pray that my rights to the present invention be limited only by the scope of the appended claims.

I claim:

1. A dog place marker system comprising a place-marker unit comprising: (i) a substantially rectangular body having a planar configuration and formed from a sheet of colored single-ply waterproof fabric; (ii) a low-profile binding secured about a peripheral edge of the substantially rectangular body; (iii) at least two grommets formed adjacent opposing corners of the substantially rectangular body, wherein the grommets are configured to be joined using a carabiner to form a wraparound enclosure for a dog, enabling a mat to function as both a resting surface and a protective cover; (iv) said substantially rectangular body having a leash opening formed through the substantially rectangular body a distance from the peripheral edge of the substantially rectangular body; (v) an electronic subsystem embedded within the substantially rectangular body and having a main electronic unit, a power unit, a controller, an RF antenna, and a sensor unit, the sensor unit being positioned adjacent to the leash opening to detect a presence of a collar in proximity to the substantially rectangular body; (vi) a remote unit configured to receive proximity data from the electronic subsystem and display alerts when the dog moves beyond a predefined threshold distance from the substantially rectangular body, in unfamiliar environments; and (vii) an on-dog electronic unit configured to communicate with the electronic subsystem to uniquely identify the dog and report its position relative to the substantially rectangular body.

2. The dog place marker system of claim 1, where said colored single-ply waterproof fabric further comprises a non-woven synthetic material.

3. The dog place marker system of claim 1, where said low-profile binding and said colored single-ply waterproof fabric are formed from a material that facilitates recognition by the dog.

4. The dog place marker system of claim 1, where said colored single-ply waterproof fabric is colored blue.

5. The dog place marker system of claim 1, where said colored single-ply waterproof fabric is colored yellow.

6. The dog place marker system of claim 1, where said colored single-ply waterproof fabric is colored blue and yellow.

7. The dog place marker system of claim 1, further comprising at least one patch-attachment base.

8. The dog place marker system of claim 1, further comprising a carry pouch and a shoulder strap.

9. The dog place marker system of claim 1, further comprising a carry pouch having pouch closures and at least one pouch attachment point.

10. A dog place marker system comprising a place-marker unit comprising: (i) a substantially rectangular body having a planar configuration and formed from a sheet of colored single-ply waterproof fabric; (ii) a low-profile binding secured about a peripheral edge of the substantially rectangular body; (iii) at least two grommets formed adjacent opposing corners of the substantially rectangular body, the grommets being configured to selectively couple together to convert the substantially rectangular body between a flat mat configuration and a wrap-around covering configuration for a dog; (iv) said substantially rectangular body having a leash opening formed through the substantially rectangular body a distance from the peripheral edge of the substantially rectangular body; (v) an electronic subsystem integrated within the substantially rectangular body having a main electronic unit, a power unit, a controller, an RF antenna, and a sensor unit, the sensor unit being positioned within the substantially rectangular body to detect a proximity of the dog located on or near the substantially rectangular body; (vi) an on-dog electronic unit configured to communicate with the electronic subsystem to identify the dog and provide additional positional information relative to the substantially rectangular body; and (vii) a remote unit configured to receive the proximity and the identification information from the electronic subsystem and the on-dog electronic unit.

11. The dog place marker system of claim 10, where said colored single-ply waterproof fabric further comprises a non-woven synthetic material.

12. The dog place marker system of claim 10, where said low-profile binding and said colored single-ply waterproof fabric are formed from a material that facilitates recognition by the dog.

13. A dog place marker method comprising the steps of: (i) providing a dog place-holder unit comprising a substantially rectangular body having a planar configuration and formed from a sheet of colored single-ply waterproof fabric, a low-profile binding secured about peripheral edge of the substantially rectangular body; and at least two grommets formed adjacent opposing corners of the substantially rectangular body, wherein said substantially rectangular body has a leash opening formed through the substantially rectangular body a distance from the peripheral edge of the substantially rectangular body and further comprising an electronic subsystem integrated within the substantially rectangular body and an on-dog electronic unit configured to communicate with the electronic subsystem, and a remote unit configured to receive proximity information; (ii) providing a carabiner; (iii) training a dog by removably placing said place-holder unit upon the dog as a covering and connecting said grommets at the dog's chest using said carabiner, wherein the on-dog electronic unit communicates with the electronic subsystem during said training; (iv) bringing the dog to an unfamiliar environment; and (v) placing said place-holder unit at a location where the dog is expected to sit and lie down and training the dog to recognize the place-holder unit as the dog's place to said sit and said lie down, wherein the electronic subsystem detects proximity of the dog to the place-holder unit and transmits the proximity information to the remote unit.

14. The dog place marker method of claim 13, comprising a step of providing a separate selectively positionable cinch strap and placing the cinch strap over said substantially rectangular body when said substantially rectangular body is placed in a covering position on the dog.

15. The dog place marker method of claim 13, comprising a step of providing a carry pouch and transporting said place-holder unit in a folded form to a desired location.

16. The dog place marker method of claim 13, comprising a step of providing a detachable patch and securing said banner to said place-holder unit upon demand.

17. The dog place marker method of claim 13, comprising a step of providing a leash and attaching said leash to the dog's collar or harness through said leash opening.

18. The dog place marker method of claim 13, comprising a step of securing said carabiner to a carry pouch upon demand.

* * * * *